United States Patent
Lindsay et al.

(10) Patent No.: US 11,552,675 B1
(45) Date of Patent: Jan. 10, 2023

(54) EXCISION OF INTERFERENCE WITH HOPPED WAVEFORMS

(71) Applicant: L3Harris Technologies, Inc., Melbourne, FL (US)

(72) Inventors: Lance R. Lindsay, Woods Cross, UT (US); L. Andrew Gibson, Riverton, UT (US); Christopher L. Brown, Sandy, UT (US); David G. Landon, Bountiful, UT (US); Edwin R. Twitchell, Fruit Heights, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 17/365,910

(22) Filed: Jul. 1, 2021

(51) Int. Cl.
*H04B 1/715* (2011.01)

(52) U.S. Cl.
CPC ..... *H04B 1/715* (2013.01); *H04B 2001/7152* (2013.01); *H04B 2201/71315* (2013.01); *H04B 2201/71353* (2013.01)

(58) Field of Classification Search
CPC ...... H04B 1/7097; H04B 1/71; H04B 1/7103; H04B 1/7107; H04B 1/713; H04B 2001/71367; H04B 2001/7152; H04B 2001/7154; H04B 2201/713;

(Continued)

(56) References Cited

U.S. PATENT DOCUMENTS

| | | | |
|---|---|---|---|
| 4,638,493 A | | 1/1987 | Bishop et al. |
| 5,671,247 A | * | 9/1997 | Souissi ............... H04B 1/7102 375/E1.023 |
| 8,433,015 B2 | | 4/2013 | Morita |

(Continued)

FOREIGN PATENT DOCUMENTS

| | | | | |
|---|---|---|---|---|
| EP | 2394368 B1 | * | 8/2016 | ........... H04B 1/1036 |
| JP | 2002271234 A | * | 9/2002 | ............. H04B 1/123 |

(Continued)

OTHER PUBLICATIONS

European Search Report received for EP Patent Application No. 22182111.9, dated Nov. 28, 2022, 9 pages.

(Continued)

*Primary Examiner* — Young T. Tse
(74) *Attorney, Agent, or Firm* — Workman Nydegger

(57) ABSTRACT

Suppressing interference in a frequency hopping signal. The method includes receiving a frequency hopping signal for a signal of interest. The frequency hopping signal includes the signal of interest modulated using frequency hopping and wideband and narrowband interference. Prior to de-hopping the frequency hopping signal, one or more wideband interferences in the frequency hopping signal are identified. The one or more wideband interferences are suppressed to create a wideband interference suppressed signal. Subsequent to suppressing the one or more wideband interferences, the wideband interference suppressed signal is de-hopped to create a de-hopped signal. In the de-hopped signal, one or more narrowband interferences are identified. The one or more narrowband interferences are suppressed to create an interference suppressed signal. The interference suppressed signal is demodulated to create a demodulated signal.

20 Claims, 5 Drawing Sheets

(58) Field of Classification Search
CPC .. H04B 2201/7135; H04B 2201/71353; H04B 2201/71315
USPC ....... 375/132, 133, 136, 260, 262, 265, 267; 370/208, 210
See application file for complete search history.

(56) References Cited

U.S. PATENT DOCUMENTS

| | | | |
|---|---|---|---|
| 8,929,492 | B2 | 1/2015 | Downey et al. |
| 9,014,315 | B1 * | 4/2015 | Hogerheiden, Jr. ... H04B 1/123 375/346 |
| 9,197,360 | B2 | 11/2015 | Wyckoff et al. |
| 9,391,654 | B2 | 7/2016 | Wyckoff et al. |
| 9,537,521 | B2 | 1/2017 | Downey et al. |

FOREIGN PATENT DOCUMENTS

| | | | | |
|---|---|---|---|---|
| JP | 2002536905 A | * | 10/2002 | ............... H04B 1/12 |
| WO | 2005/076483 A1 | | 8/2005 | |

OTHER PUBLICATIONS

Kumpumaki et al., "Narrow-band interference rejection using transform domain signal processing in a hybrid DS/FH spread-spectrum system", MILCOM 97 MILCOM 97 Proceedings, Nov. 1997.
Xiang et al., "An Intelligent Anti-jamming Frequency Hopping System", Pervasive Computing Signal Processing and Applications, Oct. 2010, pp. 1053-1056.

* cited by examiner

EXCISION OF INTERFERENCE WITH HOPPED WAVEFORMS

BACKGROUND

Background and Relevant Art

Numerous different devices can be equipped with an antenna system for transmitting and/or receiving radio frequency ("RF") communications. These RF communications may be transmitted to, or received from, any number of different external targets, endpoints, wireless network nodes, or systems. As an example, RF communications can be sent and received by walkie-talkies, cell phones, vehicles, airplanes, rotary aircraft, ships, satellites, and so on.

RF communications have advanced significantly in recent years. Now, more than ever before, devices with RF capabilities are able to establish (in many cases even simultaneously) different RF communication links with external transmitters and receivers. Such advancements have substantially improved the quality of life. Because of the benefits provided by RF communications, more and more RF components (e.g., RF front-end components and RF back-end components) are being installed into electronic devices.

With the proliferation of wireless RF communications, there is a substantial need to continuously improve such communications, especially in scenarios where signal interference may occur. Such interference may be intentional or unintentional interference. For example, with respect to intentional interference, broadband jammers and narrowband jammers (e.g., a tone generator) may be used by adversarial entities to attempt to prevent communications. With respect to unintentional interference, interference from other users/terminals, cross-polarization leakage, hardware issues, adjacent satellite interference, co-site interference, electromagnetic radiation, or other interferers may inadvertently interfere with desired communication.

Hopping waveforms are traditionally used to overcome interference by rapidly changing the signal frequency to attempt to avoid, or at least mitigate, interference. Further, various interferer excision techniques can be used to remove broadband and narrowband interference. However, when these two techniques are used together, various problems can arise. For example, in some environments, using excision results in degradation to the hopping signal of interest as notching tools view the hopping signal of interest as interference. The mischaracterization and attack of the signal of interest would result in data loss. Further, in modern systems where most of the data is Ethernet data packets, or similar data, a small amount of data loss can be catastrophic as the data would either be lost or have to be retransmitted. Retransmission results in lower data throughput. Further, Traditional interference cancelation tools are not fast enough to remove jammers for hopping waveforms.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of suppressing interference in a frequency hopping signal. The method includes receiving a frequency hopping signal for a signal of interest. The frequency hopping signal includes the signal of interest modulated using frequency hopping and wideband and narrowband interference. Prior to de-hopping the frequency hopping signal, one or more wideband interferences in the frequency hopping signal are identified. The one or more wideband interferences are suppressed to create a wideband interference suppressed signal. Subsequent to suppressing the one or more wideband interferences, the wideband interference suppressed signal is de-hopped to create a de-hopped signal. In the de-hopped signal, one or more narrowband interferences are identified. The one or more narrowband interferences are suppressed to create an interference suppressed signal. The interference suppressed signal is demodulated to create a demodulated signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are able to remove a wide variety of interfering signals from a frequency hopping signal by performing a wideband suppression operation, prior to de-hopping the frequency hopping signal, to suppress wideband interference, then de-hopping the signal, then performing a narrowband suppressing operation on the de-hopped signal to suppress narrowband interference.

The implementation of a combination of the wideband cancellation to remove stationary wide or small interference and narrowband suppression post de-hopping to remove small stationary, sweeping, or hopping interferers (such as tones, FM, inband noise, LTE, and small modulated signals) in conjunction with the hopping waveform overcomes previous limitation of excision technology and hopping waveforms. This allows the effective data transmission rate to be higher as the impacts of interference are reduced due to the removal of wideband and narrowband interference.

The implementation of the suppression only adds a minor time delay to the data transfer.

The speed of the narrowband suppression allows for the removal of interference during each hop bin.

Additionally, the disclosed embodiments beneficially classify signals and finely estimate signal parameters such that interference can be removed through demodulation, re-modulation, and subtraction (e.g., active cancellation). Accordingly, these and numerous other benefits will now be described below.

Figure 1:
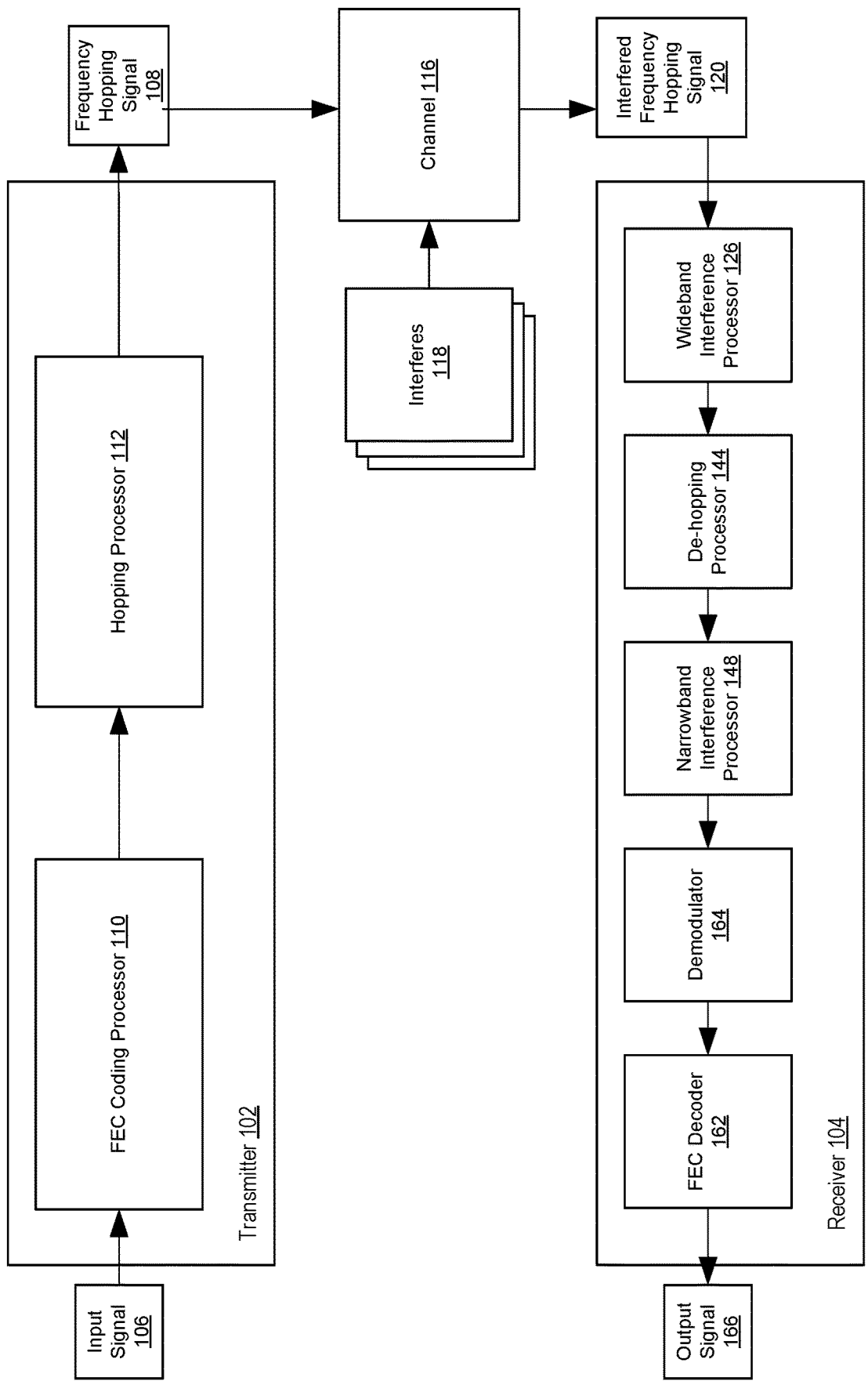
FIG. 1 illustrates a transmitter and receiver.

Referring now to FIGS. 1 and 2A-2E, an example is illustrated. FIG. 1 illustrates a transmitter 102 and a receiver 104. The transmitter 102 is configured to transmit, using various hardware such as modulators, antennas, etc., an input signal 106 to the receiver 104. As alluded to above, the transmitter 102 will send the input signal 106 by modulating the input signal 106 into a frequency hopping signal 108 to attain benefits of so doing as discussed previously above. In particular, the transmitter 102 will perform forward error correction coding at a forward error correction coding processor 110 on the input signal 106 to allow error correction to be performed at the receiver 104. The encoded input signal is then provided to a hopping processor 112. The hopping processor splits the forward error correction encoded input signal into various hop bins to create the frequency hopping signal 108 for the input signal. Note that the elements of the hopping signal 108 are sometimes referred to herein as the signal of interest, particularly when referred to in connection with injected interference and in connection with operations to suppress said interference. That is, the signal of interest refers to the various hop bins and data in the hopping signal 108 irrespective of the temporal order in which that data is received.

Figure 2A:
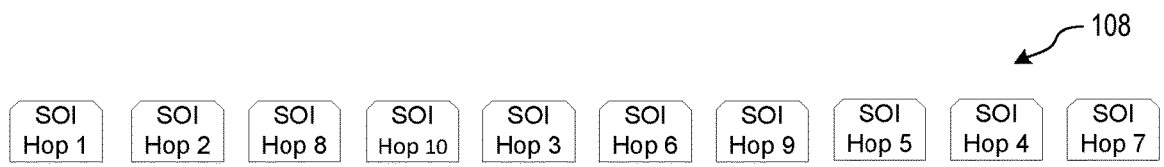
FIG. 2A illustrates a frequency hopping signal of interest.

With reference now to FIG. 2A, additional details are illustrated regarding the frequency hopping signal 108. The frequency hopping signal 108 includes various frequency SOI hop bins 1 through SOI hop bin 10. The reference numbers are selected to indicate frequency hop order. Thus, for example, the frequency hopping signal 108 hops from frequency SOI hop bin 1 to frequency SOI hop bin 2 to frequency SOI hop bin 3 to frequency SOI hop bin 4 to frequency SOI hop bin 5, and so forth. The hop bins as illustrated herein represent spectral bandwidth within the overall bandwidth allocated for the frequency hopping signal 108.

Returning once again to FIG. 1, the frequency hopping signal 108 is transmitted by the transmitter 102 through a channel 116. The channel 116 may be an over the air channel or other appropriate channel. For example, the transmitter 102 will cause electromagnetic radiation to radiate through the channel 116. The channel 116 is subject to a plurality of interferers 118. The interferers may take many forms. For example, in some embodiments, some of the interferers 118 may be intentional interferers such as jammers attempting to disrupt communication between the transmitter 102 and the receiver 104. These intentional interferers may attempt to interfere with communications in a number of different ways. For example, in some embodiments, the interferers may attempt to inject wideband interference into the channel 116 to interfere with the frequency hopping signal 108. Wideband interference may span portions of one or more frequency hop bins and is often characterized by certain traits. For example, the interference may have a particular modulation type. Alternatively or additionally, the interference may have a particular center frequency. Alternatively or additionally, the interference may have a particular symbol rate. Wideband interference may be co-channel interference including continuous wave (CW) tones and modulated signals.

Another type of intentional interference injected by interferers into the channel 116 includes narrowband interference. Narrowband interference is often characterized by signals that follow or are otherwise present in many hops, and which occupy less than half the bandwidth of any hop. Narrowband interference may comprise modulated signals, FM signals, static CW tones, multi-tones, swept tones, and hopped tones that consume, in some embodiments, up to 10% of the signal of interest bandwidth.

Other non-intentional interference may also be injected into the channel 116. This nonintentional interference may be for example interference from other users/terminals, cross-polarization leakage, hardware issues, adjacent satellite interference, co-site interference, electromagnetic radiation, or other interferers may inadvertently interfere with desired communication.

In any case, the intentional and nonintentional interference injected into the channel 116 interferes with the frequency hopping signal 108 to cause an interfered frequency hopping signal 120 to be input from the channel 116 into the receiver 104. As will be discussed in more detail below, the receiver 104 has a specialized modem configured to suppress the interference.

Figure 2B:
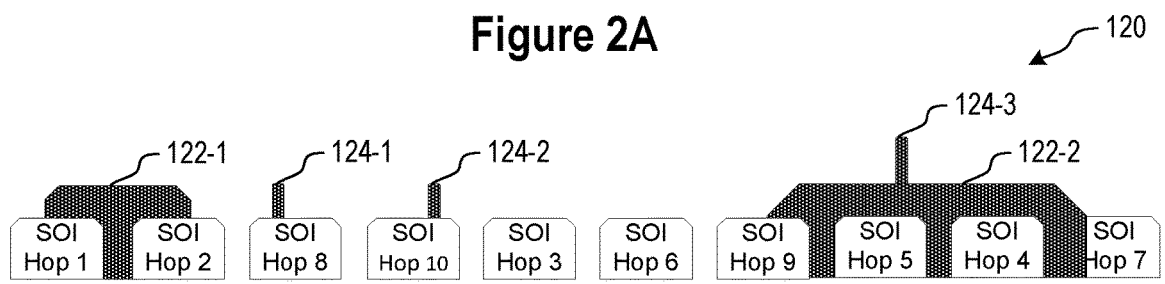
FIG. 2B illustrates an interfered frequency hopping signal.

Referring now to FIG. 2B, additional details regarding the interfered frequency hopping signal are illustrated. In particular, the interfered frequency hopping signal 120 is shown as including the frequency SOI hop bin 1 through SOI hop bin 10 as illustrated in FIG. 2A. However, the interfered frequency hopping signal 120 also includes interference that has been added to the frequency hopping signal 108. For example, FIG. 2B illustrates wideband interference 122-1, and wideband interference 122-2. Further, the interfered frequency hopping signal 120 includes narrowband interference 124-1, narrowband interference 124-2, and narrowband interference 124-3. In particular, the wideband interferers from among the interferers 118 inject the wideband interference 122-1 and 122-2. Narrowband interferers from the interferers 118 inject the narrowband interference 124-1 through 124-3.

As this interference can prevent data in the input signal 106 from being recovered and/or cause delays in transmission of data in the input signal 106, the receiver 104 includes functionality in a modem at the receiver 104 for mitigating the injected interference. As alluded to previously, this is performed in a two-step suppression of interference where wideband interference is suppressed prior to de-hopping the interfered frequency hopping signal 120 and narrowband interference is suppressed after de-hopping is performed.

In particular, the wideband interference processor 126 of the receiver 104 receives the interfered frequency hopping signal 120. The wideband interference processor 126 then performs various actions to suppress the wideband interference 122-1 and 122-2 in the interfered frequency hopping signal 120. This may be accomplished in various fashions. For example, when the wideband interference is structured interference, structured interference suppression may be performed. In particular, structured interference is interference that has one or more identifiable traits including at least one of modulation type, center frequency, frequency bandwidth, or symbol rate.

Figure 3:
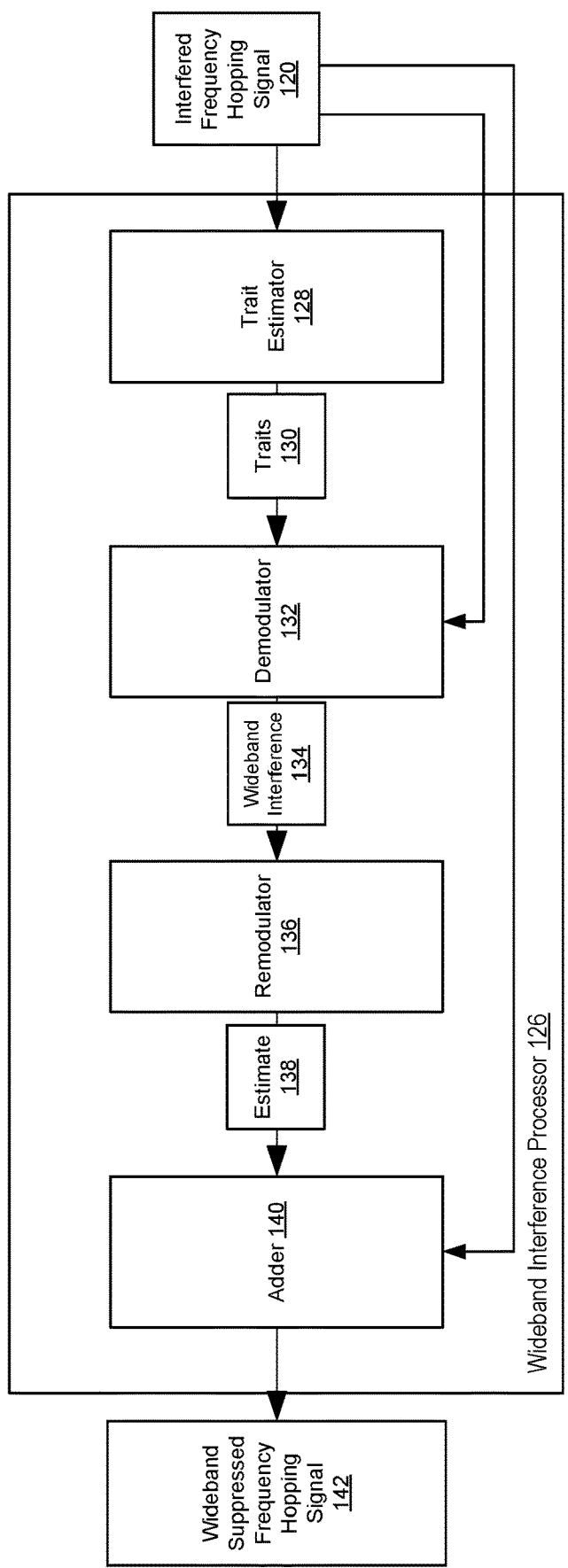
FIG. 3 illustrates a wideband interference processor.

Referring now to FIG. 3 one example embodiment of the wideband interference processor 126 is illustrated. In this example, the wideband interference processor 126 includes a trait estimator 128 that receives as input the interfered frequency hopping signal 120. The trait estimator 128 includes various hardware and processing tools including various filters, frequency analysis hardware, wave form analysis hardware, demodulators, etc. that can perform various operations on the interfered frequency hopping signal to attempt to identify traits of the wideband interference integrated into the interfered frequency hopping signal 120. Thus, the trait estimator 128 outputs traits 130 of the wideband interference 122-1 and 122-2. As discussed previously, these traits may include modulation type, center frequency, and symbol rate for the wideband interference 122-1 and 122-2. For example, the wideband interference processor may include various filters to attempt to filter out portions of the signal of interest from the interfered frequency hopping signal 120 to isolate at least a portion of the wideband interference 122-1 and 122-2. Using this isolated portion of the wideband interference 122-1 and 122-2, the wideband interference processor 126 can then attempt to identify various traits of the wideband interference 122-1 and 122-2.

With respect to modulation type, various modulation types can be identified. For example, the wideband interference may have been modulated using BPSK, QPSK, offset QPSK, 8PSK, QAM, etc. In some embodiments, the trait estimator 128 includes various corresponding demodulators to attempt to demodulate the isolated portions of the wideband interference 122-1 and 122-2. A successful demodulation identifies the modulation used to encode the wideband interference 122-1 and 122-2.

With respect to center frequency, the trait estimator 128 includes various spectral analysis tools that can be used to identify the frequency of constituent signals making up the wideband interference 122-1 and 122-2. This frequency analysis can be used to identify center frequencies for the wideband interference 122-1 and 122-2.

With respect to bit rate, the trait estimator 128 may include various phase locked loops or other timing hardware that is configured to identify symbol boundaries in the wideband interference 122-1 and 122-2 so as to identify symbol rate of the wideband interference 122-1 and 122-2.

As illustrated in FIG. 3, the traits 130 identified by the trait estimator 128 can be provided to a demodulator 132. The interfered frequency hopping signal 120 is also provided to the demodulator 132. The demodulator 132 attempts to demodulate the interfered frequency hopping signal 120 which produces demodulated wideband interference 134. Note that this demodulation process will serve to remove all or most of the portions of the interfered frequency hopping signal 120 that contain signal of interest elements. The wideband interference processor further includes a re-modulator 136 which re-modulates the demodulated wideband interference to produce an estimate 138 of the wideband interference 122-1 and wideband interference 122-2.

FIG. 3 further illustrates an adder 140 which is able to combine signal elements either constructively or destructively. In this example, the estimate 138 is added destructively to the interfered frequency hopping signal 120 to essentially remove, or at least suppress, all or portions of the wideband interference 122-1 and 122-2. In particular, FIG. 3 illustrates a wideband interference suppressed signal 142.

Figure 2C:
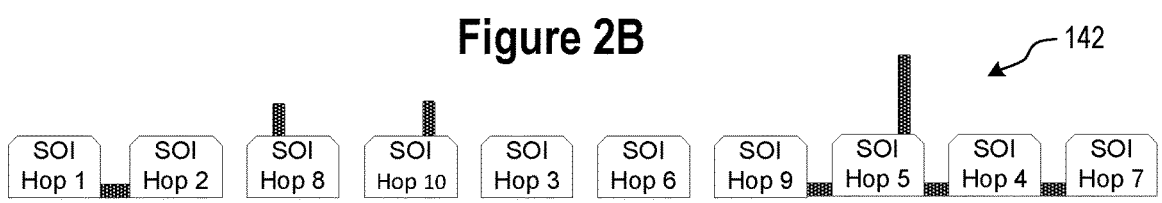
FIG. 2C illustrates a wideband interference suppressed frequency hopping signal.

Referring now to FIG. 2C, a more detailed illustration of the wideband interference suppressed signal 142 is illustrated. As illustrated in FIG. 2C, major portions of the wideband interference 122-1 and 122-2 have been removed. Note that in some embodiments it is ill-advised to completely remove all of, or just the wideband interference 122-1 and 122-2 as this can cause sharp transitions within hop bins resulting in high-frequency anomalies that are deleterious to accomplishing communications. Rather, certain wave shaping can be performed to prevent sharp frequency transitions. Thus, as noted previously, the wideband interference 122-1 and wideband interference 122-2 are suppressed in the wideband interference suppressed signal 142.

Note that in some embodiments, the wideband interference processor 126 may be channel limited in that it is only able to remove a certain number of interferences. For example, in some embodiments, only five distinct interferences can be removed. In some embodiments, the wideband interference processor 126 identifies interferences by identifying high power (either average or total) portions of the interfered frequency hopping signal 120 to identify the interferences. Thus, in some such example, a certain number of the easiest to extract interference signals can be removed. In some situations, this may be signals with the highest overall power across a spectrum, highest peak power in a particular spectral component, or based on some other characteristics.

Figure 2D:
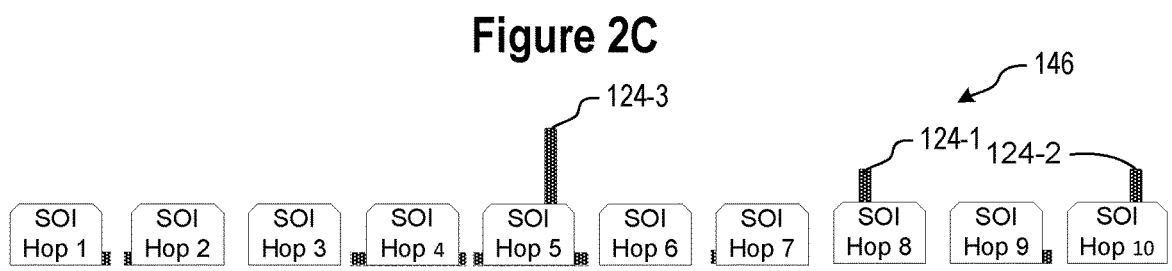
FIG. 2D illustrates a de-hopped signal.

Referring once again to FIG. 1, FIG. 1 illustrates a de-hopping processor 144. The de-hopping processor 144 is configured to de-hop the wideband interference suppressed signal 142. In particular, the wideband interference suppressed signal 142 is provided from the wideband interference processor 126 to the de-hopping processor 144. As illustrated in FIG. 2C, the de-hopping processor 144 will order the various frequency SOI hop bin 1 through SOI hop bin 10 in an appropriate order based on their frequencies. A conventional de-hopping processor may be used to implement the de-hopping processor 144. The output of the de-hopping processor 144 is a de-hopped signal 146 as illustrated in FIG. 2D. As illustrated in FIG. 2D, the de-hopped signal 146 nonetheless still includes the narrowband interference 124-1, 124-2 and 124-3.

To compensate for this narrowband interference 124-1, 124-2, and 124-3, the receiver 104 includes a narrowband interference processor 148. The narrowband interference processor 148 suppresses the narrowband interference 124-1, 124-2, and 124-3. This can be accomplished in a number of different ways. An example of one way that this can be accomplished is illustrated with reference to FIG. 4 which illustrates one example of the narrowband interference processor 148. The narrowband interference processor 148 receives as input the de-hopped signal 146. The de-hopped signal is provided to an averaging processor 150. The averaging processor 150 identifies power averages 152 of the various frequency SOI hop bin 1 through SOI hop bin 10. This can be accomplished using various hardware integrators and/or other hardware items to identify average power in each of the frequency SOI hop bin 1 through SOI hop bin 10. The de-hopped signal 146 is further provided to a spectrum analyzer 154. The spectrum analyzer analyzes the frequency SOI hop bin 1 through SOI hop bin 10 to identify frequency anomalies in the frequency SOI hop bin 1 through SOI hop bin 10. For example, the spectrum analyzer may be able to identify high power components at certain frequencies with respect to the average power identified by the averaging processor 150. In particular the spectrum analyzer will identify frequency bins 156 corresponding to the narrowband interference 124-1, 124-2, and 124-3.

Figure 2E:
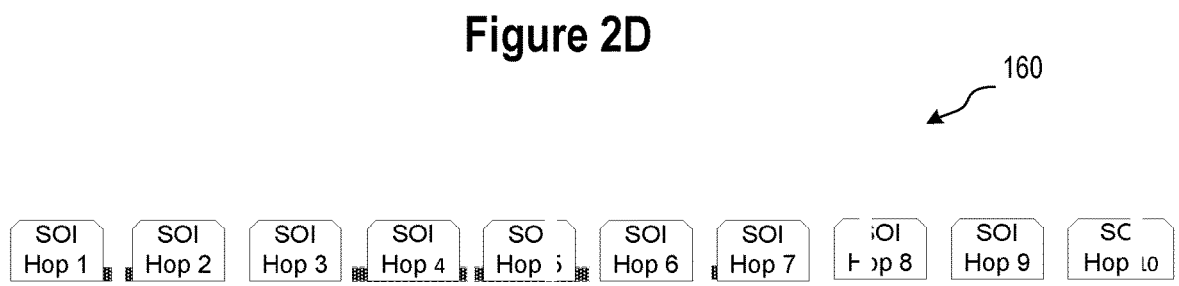
FIG. 2E illustrates an interference suppressed signal.
Figure 4:
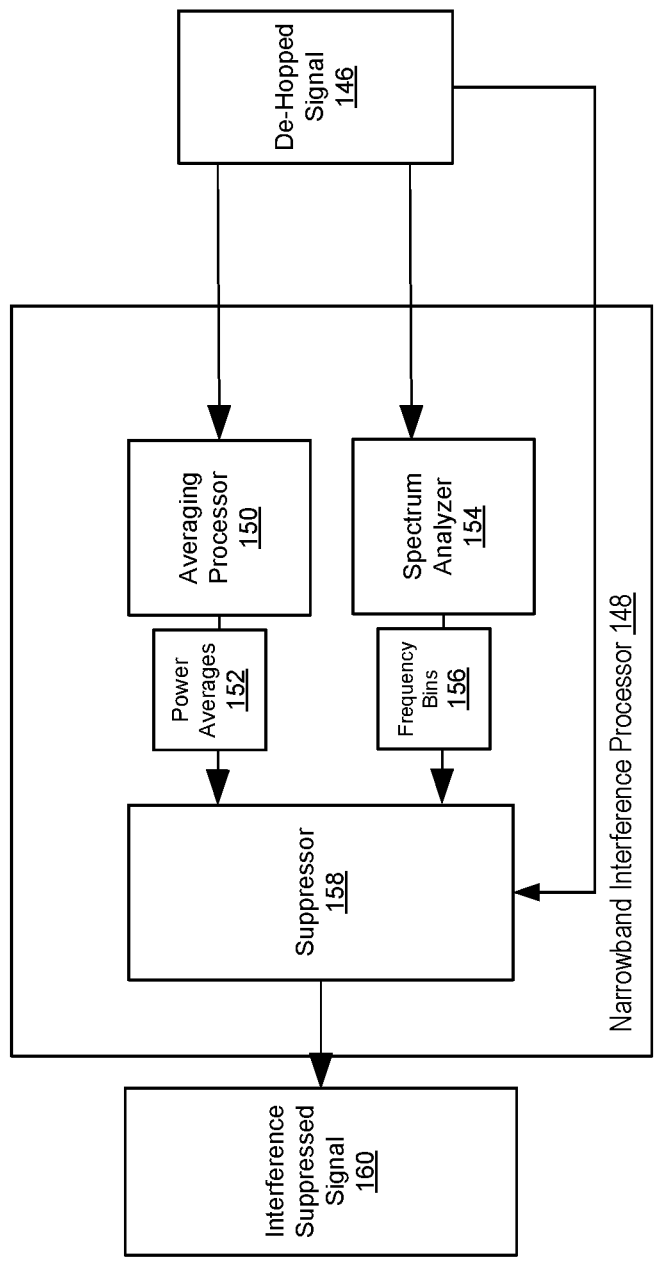
FIG. 4 illustrates a narrowband interference processor.

FIG. 4 further illustrates a suppressor 158. The suppressor 158 receives as input the power averages 152 and the frequency bins 156. The suppressor can then use the frequency bins 156 to identify anomalies in the frequency SOI hop bin 1 through SOI hop bin 10 to identify frequencies of the narrowband interference 124-1, 124-2, 124-3. The suppressor 158 can then remove all or portions of the narrowband interference 124-1, 124-2, and 124-3 to produce an interference suppressed signal 160 as illustrated in FIG. 2E. Note that in many embodiments, the narrowband interference 124-1, 124-2, 124-3 is not removed completely so as to avoid creating high frequency artifacts in the interference suppressed frequency hop signal 160. Instead, certain wave shaping techniques are performed to smooth frequency transitions.

Note that narrowband interference removal is typically not channel limited, meaning that any instances of narrowband interference can be suppressed. Further, narrowband interference suppression can be used to remove multi-tone signals as well. Further, due to the speed at which narrowband interference is able to be suppressed, embodiments can further be configured to address moving signals, such as sweeping signals, hopping interferences, etc.

Observation of the interference suppressed signal 160 shows that certain differences caused by suppressing the wideband interference 122-1 and 122-2 in the narrowband interference 124-1, 124-2, and 124-3 exist between the interference suppressed signal 160 and the frequency hopping signal 108. As will be discussed in more detail below, embodiments may include functionality for addressing these differences to reproduce the input signal 106 without errors or with a reduced number of errors. This can be done for example using forward error correction decoding by a forward error correction decoder 162 as illustrated in FIG. 1. In particular, the interference suppressed signal 160 is provided to a demodulator 164 which demodulates the interference suppressed signal 160 to attempt to obtain the symbols in the input signal 106. In particular, a bitstream or symbol stream is created by the demodulator 164. This bitstream or symbol stream is provided to the FEC decoder 162 which will perform forward error correction decoding according to the forward error correction coding scheme implemented by the forward error correction coding processor 110. The output of the forward error correction decoder is an output signal 166 that ideally is the same as the signal of interest input signal 106.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
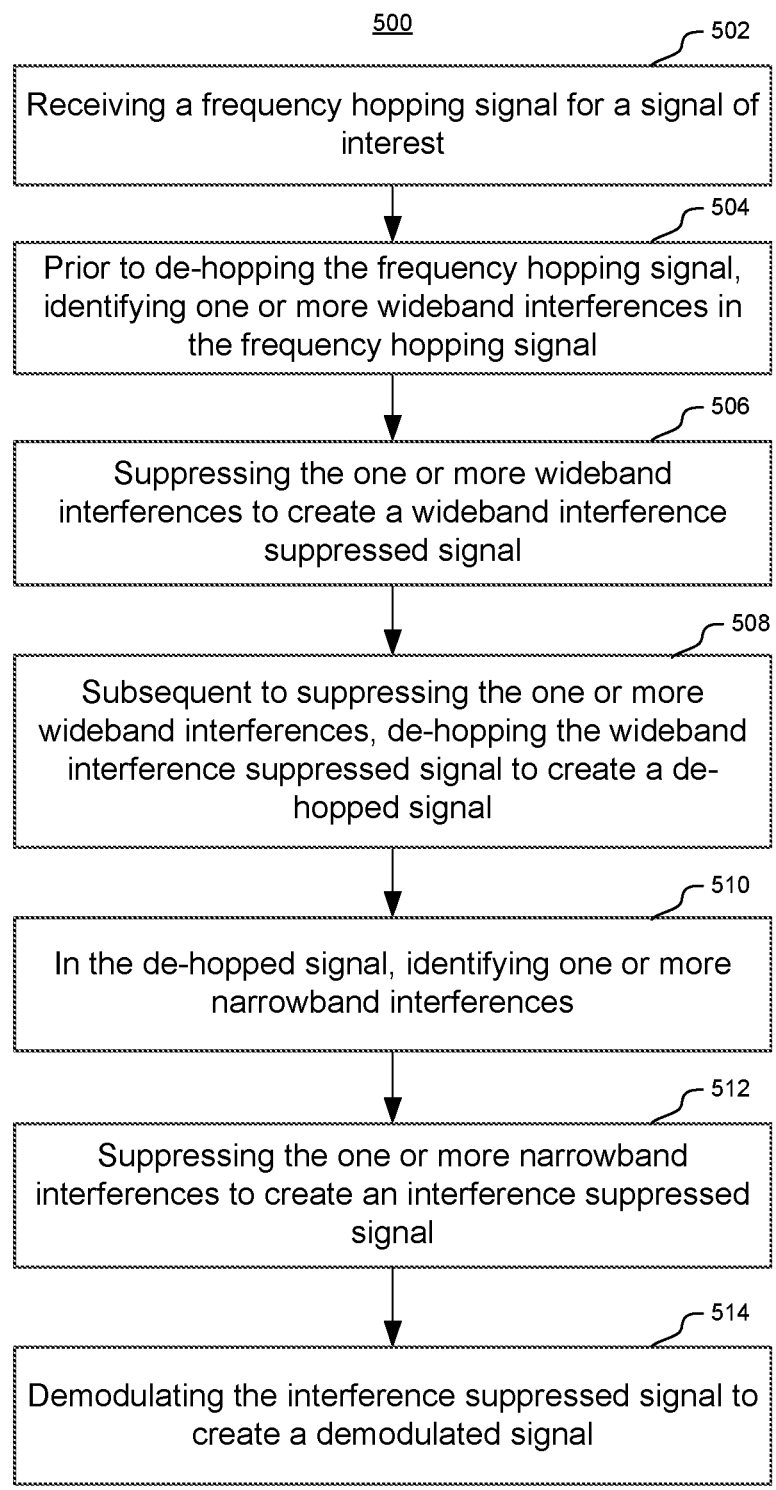
FIG. 5 illustrates a method of suppressing interference in a frequency hopping signal.

Referring now to FIG. 5, a method 500 is illustrated. The method includes acts for suppressing interference in a frequency hopping signal. The method includes receiving a frequency hopping signal for a signal of interest (act 502). The frequency hopping signal includes the signal of interest modulated using frequency hopping and wideband and narrowband interference.

The method 500 further includes, prior to de-hopping the frequency hopping signal, identifying one or more wideband interferences in the frequency hopping signal (act 504).

The method 500 further includes suppressing the one or more wideband interferences to create a wideband interference suppressed signal (act 506).

The method 500 further includes, subsequent to suppressing the one or more wideband interferences, de-hopping the wideband interference suppressed signal to create a de-hopped signal (act 508).

The method 500 further includes, in the de-hopped signal, identifying one or more narrowband interferences (act 510).

The method 500 further includes suppressing the one or more narrowband interferences to create an interference suppressed signal (act 512).

The method 500 further includes demodulating the interference suppressed signal to create a demodulated signal (act 514).

The method 500 may further include performing forward error correction decoding on the demodulated signal to correct for signal degradation caused by suppressing at least one of wideband interference and narrowband interference.

The method 500 may be practiced where suppressing the one or more wideband interferences comprises performing structured interference suppression. Structured interference is interference that has identifiable traits, including one or more of modulation type, center frequency, frequency bandwidth, or symbol rate. For example, in some such embodiments, the structured interference suppression comprises overlapping signal separation and cancellation. One type of overlapping signal separation and cancellation is successive interference cancellation whereby a receiver decodes a strongest signal first, subtracts it from the combined signal, and then decodes the difference. However, embodiments may also be implemented where interference is weaker than the signal of interest such that embodiments decodes a weaker signal, subtracts it from the combined signal, and then decodes the difference. In some structured interference suppression embodiments, the structured interference suppression comprises: identifying modulation type (e.g., BPSK, QPSK, offset QPSK, 8PSK, QAM, etc.) for the one or more wideband interferences; identifying center frequency for the one or more wideband interferences; identifying symbol rate for the one or more wideband interferences; using the identified modulation type, center frequency, and symbol rate, demodulating the frequency hopping signal to remove at least a portion of the signal of interest and to create one or more demodulated wideband interferences; remodulating the one or more demodulated wideband interferences to create an approximation of the wideband interferences in the frequency hopping signal; and subtracting the approximation of the wideband interferences from the frequency hopping signal to create a wideband interference suppressed frequency hopping signal.

The method 500 may be practiced where suppressing the one or more wideband interferences comprises performing unstructured interference suppression. Unstructured interference is interference that does not have an identifiable modulation type, center frequency, frequency bandwidth, or symbol rate. For example, white noise could properly be classified as unstructured interference.

The method 500 may be practiced where suppressing the one or more narrowband interferences comprises: averaging signal power in hop bins of the de-hopped signal; performing spectral analysis to identify frequency bins in the de-hopped signal that have signal levels above a predetermined threshold with respect to averages identified by averaging signal power in hop bins of the de-hopped signal; and suppressing frequency bins in the de-hopped signal that have signal levels above a predetermined threshold with respect to averages identified by averaging signal power in hop bins of the de-hopped signal. In some such embodiments, performing spectral analysis comprises performing a fast Fourier transform.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of suppressing interference in a frequency hopping signal, the method comprising:
   receiving the frequency hopping signal for a signal of interest, the frequency hopping signal comprising the signal of interest modulated using frequency hopping, wideband interference and narrowband interference;
   prior to de-hopping the frequency hopping signal, identifying one or more wideband interferences in the frequency hopping signal;
   suppressing the one or more wideband interferences to create a wideband interference suppressed signal;
   subsequent to suppressing the one or more wideband interferences, de-hopping the wideband interference suppressed signal to create a de-hopped signal;
   in the de-hopped signal, identifying one or more narrowband interferences;
   suppressing the one or more narrowband interferences to create an interference suppressed signal; and
   demodulating the interference suppressed signal to create a demodulated signal.

2. The method of claim 1, further comprising performing forward error correction decoding on the demodulated signal to correct for signal degradation caused by suppressing at least one of the wideband interference and the narrowband interference.

3. The method of claim 1, wherein suppressing the one or more wideband interferences comprises performing structured interference suppression.

4. The method of claim 3, wherein the structured interference suppression comprises overlapping signal separation and cancelation.

5. The method of claim 4, wherein the structured interference suppression further comprises:
identifying a modulation type for the one or more wideband interferences;
identifying a center frequency for the one or more wideband interferences;
identifying a symbol rate for the one or more wideband interferences;
using the identified modulation type, center frequency, and symbol rate, demodulating the frequency hopping signal to remove at least a portion of the signal of interest and to create one or more demodulated wideband interferences;
remodulating the one or more demodulated wideband interferences to create an approximation of the wideband interferences in the frequency hopping signal; and
subtracting the approximation of the wideband interferences from the frequency hopping signal to create a wideband interference suppressed frequency hopping signal.

6. The method of claim 1, wherein suppressing the one or more wideband interferences comprises performing unstructured interference suppression.

7. The method of claim 1, wherein suppressing the one or more narrowband interferences comprises:
averaging a signal power in hop bins of the de-hopped signal;
performing spectral analysis to identify frequency bins in the de-hopped signal that have signal levels above a predetermined threshold with respect to averages identified by averaging the signal power in the hop bins of the de-hopped signal; and
suppressing the frequency bins in the de-hopped signal that have the signal levels above the predetermined threshold with respect to the averages identified by averaging the signal power in the hop bins of the de-hopped signal.

8. The method of claim 7, wherein performing the spectral analysis comprises performing a fast Fourier transform.

9. A computer system comprising:
one or more processors; and
one or more computer-readable media having stored thereon instructions that are executable by the one or more processors to configure the computer system to suppress interference in a frequency hopping signal, the computer system, including the instructions that are executable to configure the computer system to perform at least the following:
receiving the frequency hopping signal for a signal of interest, the frequency hopping signal comprising the signal of interest modulated using frequency hopping, wideband interference and narrowband interference;
prior to de-hopping the frequency hopping signal, identifying one or more wideband interferences in the frequency hopping signal;
suppressing the one or more wideband interferences to create a wideband interference suppressed signal;
subsequent to suppressing the one or more wideband interferences, de-hopping the wideband interference suppressed signal to create a de-hopped signal;
in the de-hopped signal, identifying one or more narrowband interferences;
suppressing the one or more narrowband interferences to create an interference suppressed signal; and
demodulating the interference suppressed signal to create a demodulated signal.

10. The computer system of claim 9, wherein the one or more computer-readable media further have stored thereon instructions that are executable by the one or more processors to configure the computer system to performing forward error correction decoding on the demodulated signal to correct for signal degradation caused by suppressing at least one of the wideband interference and the narrowband interference.

11. The computer system of claim 9, wherein suppressing the one or more wideband interferences comprises performing structured interference suppression.

12. The computer system of claim 11, wherein the structured interference suppression comprises overlapping signal separation and cancelation.

13. The computer system of claim 12, wherein the structured interference suppression comprises:
identifying a modulation type for the one or more wideband interferences;
identifying a center frequency for the one or more wideband interferences;
identifying a symbol rate for the one or more wideband interferences;
using the identified modulation type, center frequency, and symbol rate, demodulating the frequency hopping signal to remove at least a portion of the signal of interest and to create one or more demodulated wideband interferences;
remodulating the one or more demodulated wideband interferences to create an approximation of the wideband interferences in the frequency hopping signal; and
subtracting the approximation of the wideband interferences from the frequency hopping signal to create a wideband interference suppressed frequency hopping signal.

14. The computer system of claim 9, wherein suppressing the one or more wideband interferences comprises performing unstructured interference suppression.

15. The computer system of claim 9, wherein suppressing the one or more narrowband interferences comprises:
averaging a signal power in hop bins of the de-hopped signal;
performing spectral analysis to identify frequency bins in the de-hopped signal that have signal levels above a predetermined threshold with respect to averages identified by averaging the signal power in the hop bins of the de-hopped signal; and
suppressing the frequency bins in the de-hopped signal that have the signal levels above the predetermined threshold with respect to the averages identified by averaging the signal power in the hop bins of the de-hopped signal.

16. The computer system of claim 15, wherein performing the spectral analysis comprises performing a fast Fourier transform.

17. A wireless receiver comprising:
a wideband interference processor configured to receive a frequency hopping signal for a signal of interest, the frequency hopping signal comprising the signal of interest modulated using frequency hopping, wideband interference and narrowband interference;

wherein the wideband interference processor is further configured to, prior to de-hopping the frequency hopping signal:
identify one or more wideband interferences in the frequency hopping signal; and
suppress the one or more wideband interferences to create a wideband interference suppressed signal;

a de-hopping processor coupled to the wideband interference processor that is configured to, subsequent to suppressing the one or more wideband interferences, de-hopping the wideband interference suppressed signal to create a de-hopped signal;

a narrowband interference processor that is configured to:
in the de-hopped signal, identify one or more narrowband interferences; and
suppress the one or more narrowband interferences to create an interference suppressed signal; and a demodulator coupled to the narrowband interference processor that is configured to demodulate the interference suppressed signal to create a demodulated signal.

18. The wireless receiver of claim 17, further comprising a forward error correction decoder coupled to the demodulator and configured to perform error correction decoding on the demodulated signal to correct for signal degradation caused by suppressing at least one of the wideband interference and the narrowband interference.

19. The wireless receiver of claim 17, wherein the wideband interference processor is configured to suppress the wideband interference by performing structured interference suppression.

20. The wireless receiver of claim 17, wherein the narrowband interference processor comprises:
an averaging processor configured to average a signal power in hop bins of the de-hopped signal;
a spectrum analyzer configured to perform spectral analysis to identify frequency bins in the de-hopped signal that have signal levels above a predetermined threshold with respect to averages identified by averaging the signal power in the hop bins of the de-hopped signal; and
a suppressor coupled to the averaging processor and the spectrum analyzer and configured to suppress the frequency bins in the de-hopped signal that have the signal levels above the predetermined threshold with respect to the averages identified by averaging the signal power in the hop bins of the de-hopped signal.

* * * * *